Dec. 28, 1926.
M. DE GROOTE
1,612,180
PROCESS FOR BREAKING PETROLEUM EMULSIONS
Filed April 29, 1926
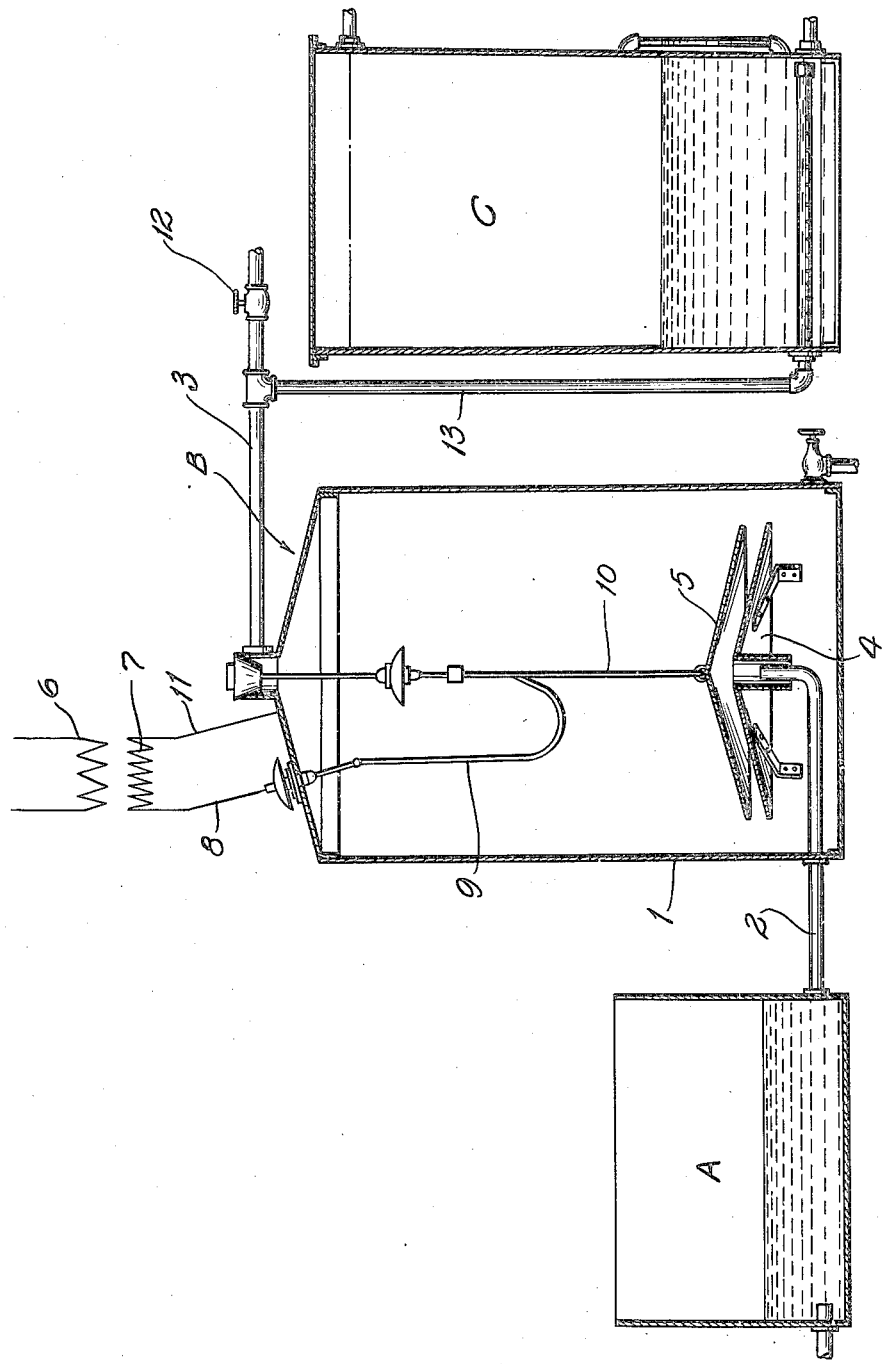
INVENTOR:
MELVIN DE GROOTE.
By Bakewell Church
ATTORNEYS.

Patented Dec. 28, 1926.

1,612,180

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR BREAKING PETROLEUM EMULSIONS.

Application filed April 29, 1926. Serial No. 105,442.

This invention relates to the treatment of emulsions of mineral oil and water, such as petroleum emulsions, for the purpose of breaking the emulsion, and thus causing or permitting the oil to separate from the water.

Petroleum emulsions are of the water-in-oil type and comprise fine droplets of natural occurring waters or brines dispersed in a more or less permanent state throughout the oil which constitutes the continuous phase of the emulsion. They are obtained from producing wells and from the bottoms of storage tanks and are commonly referred to as "cut oil", "roily oil", "emulsified oil", "bottom settlings", etc.

The object of my present invention is to provide a novel and inexpensive process for separating emulsions of the kind referred to into their component parts of oil and water or brine so as to obtain merchantable oil that will be accepted by pipe line companies.

It has been heretofore proposed to break petroleum emulsions of the water-in-oil type by adding to the emulsion a modifying agent and also subjecting the emulsion to electrical tension between electrodes maintained at a potential difference of around 11,000 volts, as described in U. S. Patent to W. O. Eddy, No. 1,529,349, dated March 10, 1925.

In the said Eddy process the essential characteristic of the modifying agent is that it be capable of changing the interfacial tension of the constituents of the emulsion. Moreover, said Eddy process contemplates subjecting the emulsion to electrical tension immediately after the modifying agent has been added.

I have discovered that if a petroleum emulsion of the water-in-oil type is subjected first to the action of a chemical demulsifying agent which is permitted to act on the emulsion until the emulsion shows a tendency to break, and second, to electrical dehydration, the emulsion can be broken more effectively than is possible with a one step electrical dehydration process of the kind described in said Eddy patent. Any suitable type of electrical dehydration apparatus may be employed, but I prefer to use an apparatus that is operated by electric current of relatively high voltage, as in the process described in U. S. Patent No. 1,570,209 to J. H. C. De Brey, dated January 19, 1926, which contemplates subjecting the emulsion to the action of a pulsating, alternating current, the peak voltage of which is a multiple, but at least the double, of the effective voltage.

The figure of the drawings is a diagrammatic vertical sectional view of an apparatus that can be used for practising my process.

In practising my process the emulsion is first subjected to the action of a chemical demulsifying agent of the kind now used extensively in the oil fields for breaking petroleum emulsions of the water-in-oil type, such, for example, as hydroxy stearic acid, beta naphthol ester of ricinoleic acid and stearo lactones, such as are used in the "Tret-O-Lite" process. After the demulsifying agent has been added to, mixed with, or introduced into the emulsion, the emulsion is either introduced into a flow line or into a treating tank A and allowed to remain in same until a breaking action begins, or, in other words, until centrifugal tests indicate incipient breaking action. The time required for this action will vary according to the temperature and nature of the emulsion. This period of time may be relatively short, or it may be several hours. Hence, the necessity of confining the emulsion in a treating tank or in a flow line which has sufficient volume to provide time enough for the emulsion to be affected while it is flowing through said line. The breaking action or tendency to break can be easily determined by a centrifugal test which will show a decrease in the emulsion content or increase in water content.

After being subjected to the above treatment the emulsion is introduced into an electrical dehydrator B that comprises a metal tank 1 provided at its lower end with an intake 2 and at its upper end with a discharge pipe 3 through which the emulsion escapes from the dehydrator, a grounded electrode 4 arranged inside of the tank 1 and connected to the side wall of same, a live electrode 5 arranged above and in spaced relation to the grounded electrode, and a transformer provided with a primary 6 and a secondary 7, one terminal 8 of said secondary being connected by a wire 9 to a rod 10 that sustains the live electrode and the other terminal 11 of said secondary being connected to the tank 1. The dehydrator B may either be operated by electric current of a voltage around 11,000, as in the conventional Cottrell electrical dehydrator, or it may be operated by electric current of a much higher voltage, as contemplated by the process described in said De Brey patent, the higher voltage being preferable. The discharge pipe 3 of the dehydrator is provided with an outlet valve 12 and a branch 13 that leads to a settling tank C, thereby permitting the treated liquid to be drawn directly from the dehydrator or passed into the settling tank in the event it is necessary or desirable to have the liquid remain in a quiescent state after the electrical dehydrating action so as to cause the oil and water to separate by gravity.

Having thus described my invention, what I claim as new and desire to secure by Letters Patent is:

1. A process for breaking petroleum emulsions of the water-in-oil type, characterized by subjecting the emulsion to the action of a chemical demulsifying agent, and subsequently, after an incipient tendency to break has occured, subjecting the emulsion to electrical dehydration.

2. A process for breaking petroleum emulsions, characterized by subjecting the emulsion to the action of a chemical demulsifying agent, and subsequently, after the emulsion indicates a tendency to break, introducing it into an electric dehydrator wherein the emulsion is subjected to the action of a pulsating, alternating current having a peak voltage which is a multiple of the effective voltage.

3. A process for breaking petroleum emulsions of the water-in-oil type which consists in subjecting the emulsion to the action of a chemical demulsifying agent, introducing the emulsion into an electrical dehydrator after it shows a tendency to break and causing it to be subjected to electrical tension in said dehydrator, and finally removing the treated liquid from said electrical dehydrator and introducing it into a settling tank wherein it is permitted to remain in a quiescent state so as to cause the water and oil to separate by gravity.

MELVIN DE GROOTE.